United States Patent
Tang et al.

(10) Patent No.: US 11,496,835 B2
(45) Date of Patent: Nov. 8, 2022

(54) SPEAKER CONTROL METHOD AND MOBILE TERMINAL

(71) Applicant: VIVO MOBILE COMMUNICATION CO., LTD., Dongguan (CN)

(72) Inventors: Zhiwei Tang, Dongguan (CN); Yewei Huang, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 0 days.

(21) Appl. No.: 17/093,503

(22) Filed: Nov. 9, 2020

(65) Prior Publication Data

US 2021/0058704 A1 Feb. 25, 2021

Related U.S. Application Data

(63) Continuation of application No. PCT/CN2019/086134, filed on May 9, 2019.

(30) Foreign Application Priority Data

May 29, 2018 (CN) .......................... 201810534288.9

(51) Int. Cl.
*H04M 1/00* (2006.01)
*H04R 3/12* (2006.01)
*H04M 1/02* (2006.01)

(52) U.S. Cl.
CPC ............ *H04R 3/12* (2013.01); *H04M 1/0216* (2013.01); *H04M 1/0268* (2013.01)

(58) Field of Classification Search
CPC ............. H04M 1/0214; H04M 1/0216; H04M 1/0245; H04M 1/0268; H04R 5/02; H04R 2205/024; H04R 3/12
See application file for complete search history.

(56) References Cited

U.S. PATENT DOCUMENTS 8,712,393 B2 * 4/2014 Kim ...................... G06F 1/1626
                                                              455/418
9,215,528 B2 * 12/2015 Jia ............................ H04R 5/04
(Continued)

FOREIGN PATENT DOCUMENTS

CN 1543171 A 11/2004
CN 106162447 A 11/2016
CN 108040313 A 5/2018
(Continued)

OTHER PUBLICATIONS

International Search Report issued in corresponding International Application No. PCT/CN2019/086134, dated Jul. 25, 2019, 4 pages.

*Primary Examiner* — Nhan T Le
(74) *Attorney, Agent, or Firm* — IPX PLLC

(57) ABSTRACT

This disclosure provides a speaker control method and a mobile terminal. The method is performed by the mobile terminal, and the mobile terminal includes at least two speakers. The method includes obtaining a use state of the mobile terminal, and determining corresponding audio mode information based on the use state of the mobile terminal, where the audio mode information includes audio modes of the at least two speakers. The method further includes controlling each speaker to work in a corresponding audio mode in the audio mode information.

12 Claims, 7 Drawing Sheets

(56) References Cited

U.S. PATENT DOCUMENTS

2020/0037433 A1* 1/2020 Dong .................... G06F 1/1652
2020/0249897 A1* 8/2020 de Paz .................. G06F 1/1616

FOREIGN PATENT DOCUMENTS

| CN | 108134868 A | 6/2018 |
| CN | 108551636 A | 9/2018 |
| WO | 2011118429 A1 | 9/2011 |

* cited by examiner

SPEAKER CONTROL METHOD AND MOBILE TERMINAL

CROSS-REFERENCE TO RELATED APPLICATIONS

This application is a bypass continuation of PCT Application No. PCT/CN2019/086134 filed May 9, 2019, which claims priority to Chinese Patent Application No. 201810534288.9 filed in China on May 29, 2018, both of which are incorporated herein by reference in their entireties.

TECHNICAL FIELD

Embodiments of this disclosure relate to the field of speaker technologies, and in particular, to a speaker control method and a mobile terminal.

BACKGROUND

In the related art, as users have increasingly high demands for audio and video experience, screens of mobile terminals such as mobile phones are bigger, which can improve visual experience. In addition, a larger screen area allows for more speakers to improve a sound effect of the mobile terminal.

However, setting up more speakers in a mobile terminal brings some risks. Specifically, if the speakers do not cooperate but interfere with each other, the sound effect of the mobile terminal cannot be guaranteed, but will be seriously affected.

SUMMARY

Embodiments of this disclosure provide a speaker control method and a mobile terminal, to resolve a problem that a play sound effect of a mobile terminal is affected when speakers in the mobile terminal do not cooperate but interfere with each other.

According to a first aspect, an embodiment of this disclosure provides a speaker control method, applied to a mobile terminal, where the mobile terminal includes at least two speakers, and the method includes obtaining a use state of the mobile terminal, and determining corresponding audio mode information based on the use state of the mobile terminal, where the audio mode information includes audio modes of the at least two speakers. The method further includes controlling each speaker to work in a corresponding audio mode in the audio mode information.

According to a second aspect, an embodiment of this disclosure provides a mobile terminal, where the mobile terminal includes at least two speakers, and the mobile terminal includes an obtaining module configured to obtain a use state of the mobile terminal. The mobile terminal also includes a determining module configured to determine corresponding audio mode information based on the use state of the mobile terminal, where the audio mode information includes a corresponding audio mode of each speaker. The mobile terminal further includes a control module configured to control each speaker to work in the corresponding audio mode in the audio mode information.

According to a third aspect, an embodiment of this disclosure provides a mobile terminal, including a processor, a memory, and a computer program that is stored in the memory and capable of running on the processor, where when the computer program is executed by the processor, the steps of the foregoing speaker control method are implemented.

In the embodiments of this disclosure, the mobile terminal obtains the use state of the mobile terminal, and determines the corresponding audio mode information based on the obtained use state, where the audio mode information is audio mode information that matches the obtained use state. The mobile terminal then controls each speaker to work in the corresponding audio mode. In this way, the mobile terminal can provide a good sound effect. It can be learned that in the embodiments of this disclosure, audio modes of the speakers in the mobile terminal are not fixed, and the mobile terminal can control each speaker to work in the corresponding audio mode based on the use state of the mobile terminal. To be specific, the mobile terminal can flexibly adjust the audio modes of the speakers based on the use state of the mobile terminal. In this way, the speakers can always cooperate with each other without mutual interference. Therefore, compared with the related art, the embodiments of this disclosure can effectively ensure the sound effect of the mobile terminal.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following descriptions show merely some embodiments of this disclosure, and a person of ordinary skill in the art may derive other drawings from these accompanying drawings without creative efforts.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

The following first describes a speaker control method according to an embodiment of this disclosure.

Figure 1:
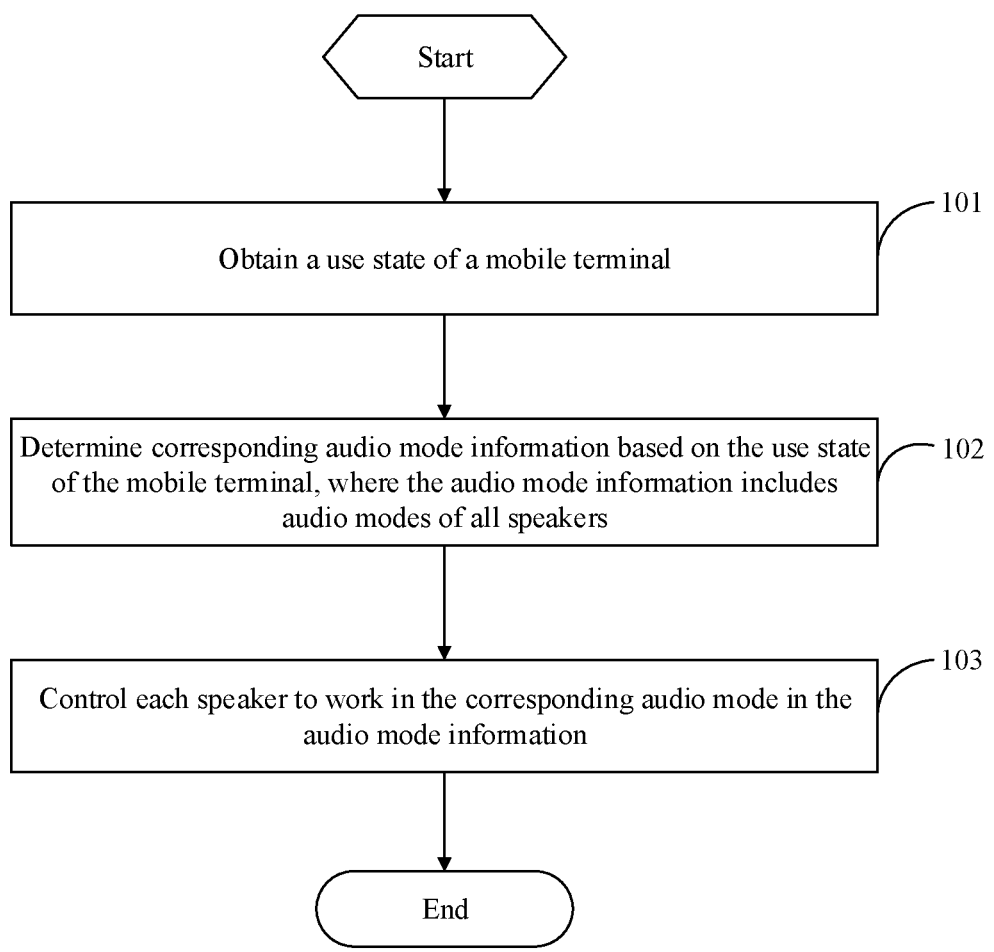
FIG. 1 is a flowchart of a speaker control method according to an embodiment of this disclosure.

FIG. 1 is a flowchart of a speaker control method according to an embodiment of this disclosure. As shown in FIG. 1, the method is applied to a mobile terminal, and the mobile terminal includes at least two (for example, two, three, four, or more than four) speakers. The method includes the following steps.

Step 101: Obtain a use state of the mobile terminal.

In this embodiment of this disclosure, the mobile terminal may be any device with the communication function, for example, a computer, a mobile phone, a tablet computer, a laptop computer, a Personal Digital Assistant (PDA), a Mobile Internet Device (MID), or a wearable device.

It should be noted that the mobile terminal can periodically obtain the use state of the mobile terminal; or the mobile terminal can obtain the use state of the mobile terminal when a specific condition is met. The use state obtained by the mobile terminal may include an application running state, a screen use state, and the like. Specifically, the application running state can be used to represent whether an application running in the foreground of the mobile terminal is a video application, a game application, or a communication application; and the screen use state can be used to represent whether the mobile terminal uses full-screen or split-screen display.

Step 102: Determine corresponding audio mode information based on the use state of the mobile terminal, where the audio mode information includes audio modes of all speakers.

In this embodiment of this disclosure, the mobile terminal may pre-store a correspondence between the use state and the audio mode information. Any audio mode information includes audio modes of all speakers in the mobile terminal, and the audio mode may include an off mode, a mono-channel play mode (for example, a left-channel play mode or a right-channel play mode), and the like. It should be emphasized that audio mode information corresponding to any use state is audio mode information that matches the use state. In other words, when the audio mode information is used in the use state, the speakers in the mobile terminal can cooperate with each other without mutual interference, and the mobile terminal can provide a good sound effect.

It may be understood that in the pre-stored correspondence, the use state and the audio mode information may be in a one-to-one correspondence. Certainly, the use state and the audio mode information may not be in a one-to-one correspondence. For example, two different use states may correspond to the same audio mode information.

In this embodiment of this disclosure, after performing step 101 of obtaining a use state of the mobile terminal, the mobile terminal can easily determine the audio mode information corresponding to the obtained use state based on the pre-stored correspondence, where the audio mode information is the audio mode information that matches the obtained use state.

Step 103: Control each speaker to work in the corresponding audio mode in the audio mode information.

Assuming that in the audio mode information determined in step 102, if an audio mode of one speaker is an off mode, in step 103, the mobile terminal controls the speaker to work in the off mode, that is, keeps the speaker off; or assuming that in the audio mode information determined in step 102, an audio mode of another speaker is a mono-channel play mode, in step 103, the mobile terminal controls the speaker to work in the mono-channel play mode.

When step 103 is being performed, a speaker in the mobile terminal may need to switch the audio mode. During the audio mode switching, sound of these speakers may change suddenly, or may change smoothly. For example, if a speaker needs to be switched from the mono-channel play mode to the off mode, sound of the speaker may be terminated directly, or may change smoothly from strong to weak.

In this embodiment of this disclosure, the mobile terminal obtains the use state of the mobile terminal, and determines the corresponding audio mode information based on the obtained use state, where the audio mode information is the audio mode information that matches the obtained use state. The mobile terminal then controls each speaker to work in the corresponding audio mode. In this way, the mobile terminal can provide a good sound effect. It can be learned that in this embodiment of this disclosure, audio modes of the speakers in the mobile terminal are not fixed, and the mobile terminal can control each speaker to work in the corresponding audio mode based on the use state of the mobile terminal. To be specific, the mobile terminal can flexibly adjust the audio modes of the speakers based on the use state of the mobile terminal. In this way, the speakers can always cooperate with each other without mutual interference. Therefore, compared with the related art, this embodiment of this disclosure can effectively ensure a sound effect of the mobile terminal.

Optionally, the mobile terminal may include a foldable screen, for example, a foldable screen that can fold 180 degrees inward along a center line.

Obtaining a use state of the mobile terminal includes: obtaining a screen use state of the mobile terminal, where the screen use state includes at least one of a screen folding state or a screen display state.

Specifically, the screen folding state may be an unfolded state (for example, states shown in FIG. 2 to FIG. 4) or a folded state (for example, a state shown in FIG. 5); and the screen display state may be a full-screen display state or a split-screen display state. It can be understood that the screen display state can be used to represent whether the mobile terminal uses full-screen or split-screen display.

It should be noted that the mobile terminal can detect whether a user is using the mobile terminal in the split-screen display state through software, to determine the screen display state.

Specifically, the mobile terminal may provide the user with an option for selecting split-screen display. When the mobile terminal detects through the software that this option is activated, the mobile terminal can determine that the user is using the mobile terminal in split screens (for example, operating two applications simultaneously in split screens). Therefore, the screen display state of the mobile terminal is the split-screen display state. When the mobile terminal detects through the software that this option is deactivated, the mobile terminal can determine that the user is using the mobile terminal in full screen. Therefore, the screen display state of the mobile terminal is the full-screen display state. In this way, the mobile terminal can easily determine the screen display state of the mobile terminal.

In addition, the mobile terminal may use an infrared sensor, a pressure sensor, a mechanical switch, or the like to determine the screen folding state. For clear layout, a specific implementation for determining the screen folding state is described later by using an example.

It can be learned that in this embodiment, the mobile terminal with a foldable screen can obtain the screen use state that includes at least one of the screen folding state or the screen display state, and use the obtained screen use state as the use state of the mobile terminal. Therefore, in this embodiment, the mobile terminal can easily obtain the use state of the mobile terminal. In addition, when the screen folding state of the mobile terminal changes, resulting in changes of relative positions of some speakers, the mobile terminal can flexibly adjust the audio modes of the speakers to effectively ensure the sound effect of the mobile terminal.

Optionally, determining corresponding audio mode information based on the use state of the mobile terminal includes: determining first-type audio mode information when the screen folding state is an unfolded state and the screen display state is a full-screen display state; determining second-type audio mode information when the screen folding state is an unfolded state and the screen display state is a split-screen display state; and determining third-type audio mode information when the screen folding state is a folded state.

The first-type audio mode information, the second-type audio mode information, and the third-type audio mode information are different from each other.

It can be learned that in this embodiment, due to different screen folding states and screen display states in the use state, the mobile terminal can determine different audio mode information, thereby ensuring that the use state of the mobile terminal matches the determined audio mode information.

Optionally, the foldable screen includes a first sub-screen and a second sub-screen. The mobile terminal is provided with a first speaker corresponding to the first sub-screen, and the mobile terminal is provided with a second speaker corresponding to the second sub-screen. Specifically, a sound outlet of the first speaker may be located in a terminal border at the bottom of the first sub-screen, and a sound outlet of the second speaker may be located in a terminal border at the bottom of the second sub-screen.

In the first-type audio mode information, audio modes of the first speaker and the second speaker form a stereo play mode.

In the second-type audio mode information, the first speaker is in a mono-channel play mode or a mixed-channel play mode, and the second speaker is in a mono-channel play mode or a mixed-channel play mode.

In the third-type audio mode information, one of the first speaker and the second speaker is in a mono-channel play mode or a mixed-channel play mode, and the other of the first speaker and the second speaker is in an off mode.

It should be noted that sound played in the mixed-channel play mode is obtained by mixing left-channel sound and right-channel sound.

It can be understood that in the first-type audio mode information, to form the stereo play mode, one of the first speaker and the second speaker uses a left-channel play mode, and the other of the first speaker and the second speaker uses a right-channel play mode.

The following describes a specific implementation process of this embodiment by using a specific example with reference to FIG. 2 to FIG. 5.

In this embodiment, the mobile terminal includes a foldable screen that can fold 180 degrees inward along a center line 200. The foldable screen includes a first sub-screen 201 and a second sub-screen 202. The mobile terminal is provided with a first speaker 211 corresponding to the first sub-screen 201, and the mobile terminal is provided with a second speaker 212 corresponding to the second sub-screen 202.

Figure 2:
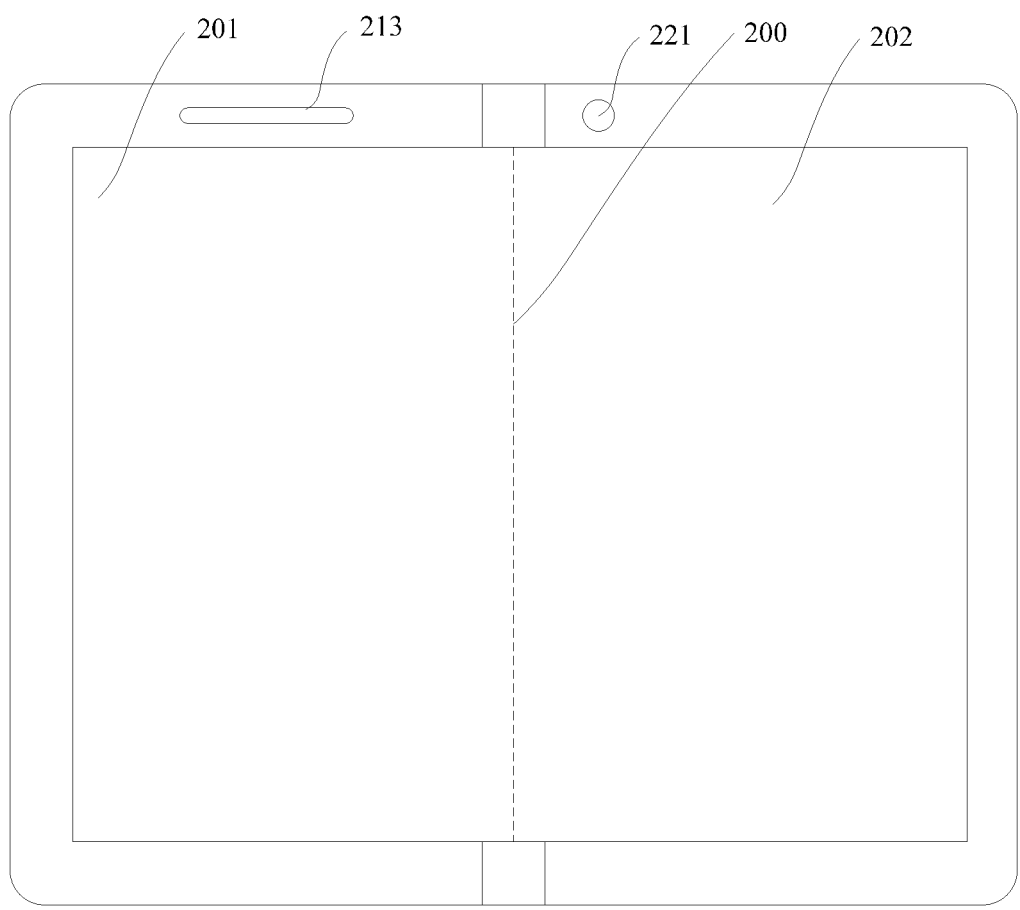
FIG. 2 is a schematic diagram of a use state of a mobile terminal.

When the mobile terminal is in a state shown in FIG. 2, a user can use the mobile terminal to play a video in full screen (or listen to music). In this case, the first sub-screen 201 and the second sub-screen 202 are used together to display one video. The screen folding state of the mobile terminal is an unfolded state and the screen display state of the mobile terminal is a full-screen display state. Therefore, the mobile terminal can determine the first-type audio mode information.

Specifically, in the first-type audio mode information, the first speaker 211 may be in a left-channel play mode, and the second speaker 212 may be in a right-channel play mode, to form a stereo play mode. Based on the first-type audio mode information, the mobile terminal can control the first speaker 211 to work in the left-channel play mode, and control the second speaker 212 to work in the right-channel play mode. In this way, the first speaker 211 and the second speaker 212 can cooperate with each other without mutual interference, and the user can hear stereo sound emitted by the mobile terminal based on the first speaker 211 and the second speaker 212.

Figure 3:
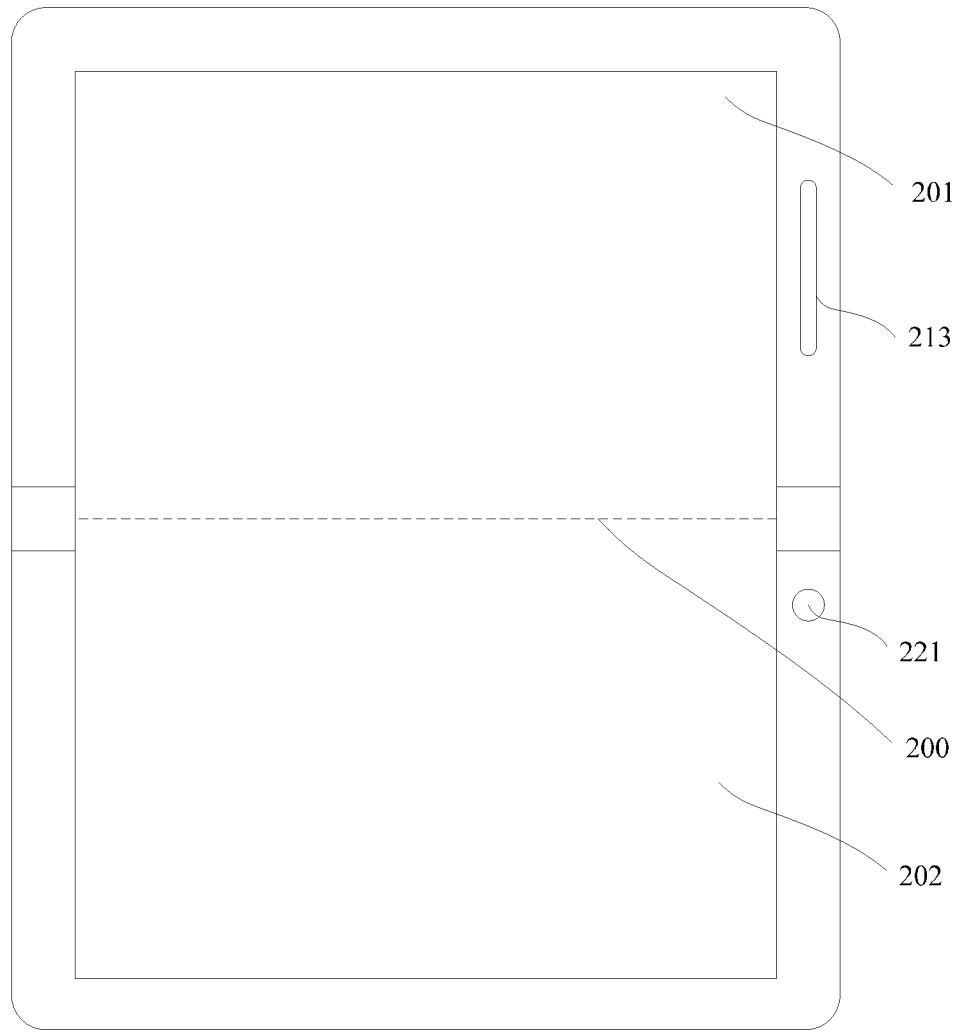
FIG. 3 is a schematic diagram of another use state of a mobile terminal.

When the mobile terminal is in a state shown in FIG. 3 (which is obtained by rotating the foldable screen 90 degrees clockwise in FIG. 2), the user can use the first sub-screen 201 to play a video, and use the second sub-screen 202 for receiving and sending information (for example, a short message). The screen folding state of the mobile terminal is an unfolded state and the screen display state of the mobile terminal is a split-screen display state. Therefore, the mobile terminal can determine the second-type audio mode information.

Specifically, in the second-type audio mode information, the first speaker 211 may be in a mono-channel play mode or a mixed-channel play mode, and the second speaker 212 may also be in a mono-channel play mode or a mixed-channel play mode. The first speaker 211 is configured to emit video play sound, and the second speaker 212 is configured to emit information receiving sound. Based on the second-type audio mode information, the mobile terminal can control the first speaker 211 to work in a mono-channel play mode or a mixed-channel play mode, and control the second speaker 212 to work in a mono-channel play mode or a mixed-channel play mode. In this way, the first speaker 211 and the second speaker 212 can cooperate with each other without mutual interference, and the user can hear video play sound and information receiving sound emitted by the mobile terminal.

Figure 5:
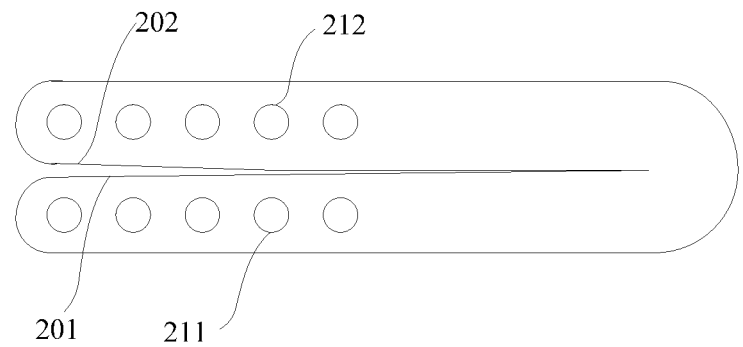
FIG. 5 is a schematic diagram of still another use state of a mobile terminal.

When the mobile terminal is in a state shown in FIG. 5 (which is obtained by folding the foldable screen 180 degrees inward along the center line 200 in FIG. 2), the user can use the mobile terminal to play music. In this case, the first sub-screen 201 and the second sub-screen 202 are attached to each other, the first speaker 211 and the second speaker 212 are close to each other, and the screen folding state of the mobile terminal is a folded state. Therefore, the mobile terminal can determine the third-type audio mode information.

Specifically, in the third-type audio mode information, the first speaker 211 may be in a mono-channel play mode or a mixed-channel play mode, and the second speaker 212 may be in an off mode. Based on the third-type audio mode information, the mobile terminal can control the first speaker 211 to work in the mono-channel play mode or the mixed-channel play mode, and control the second speaker 212 to work in the off mode. In this way, the first speaker 211 and the second speaker 212 do not interfere with each other, and the user can hear normal music play sound emitted by the mobile terminal.

It can be learned that in this embodiment, based on different use states, the mobile terminal can control the first speaker 211 and the second speaker 212 to work in corresponding audio modes, to ensure that the first speaker 211 and the second speaker 212 cooperate with each other without mutual interference, thereby effectively ensuring a sound effect of the mobile terminal.

Optionally, the mobile terminal is further provided with a third speaker corresponding to the first sub-screen.

In the first-type audio mode information, the third speaker is in an off mode.

In the second-type audio mode information, audio modes of the third speaker and the first speaker form a stereo play mode.

In the third-type audio mode information, the third speaker is in an off mode.

In this embodiment, the mobile terminal may further be provided with a third speaker 213, shown in FIG. 2 and FIG. 3, corresponding to the first sub-screen 201.

When the mobile terminal is in the state shown in FIG. 2, in the first-type audio mode information determined by the mobile terminal, the third speaker 213 is in an off mode. In this way, based on the first-type audio mode information, the mobile terminal controls the third speaker 213 to work in the off mode, thereby preventing the third speaker 213 from causing interference to the mobile terminal by the stereo sound emitted by the first speaker 211 and the second speaker 212.

When the mobile terminal is in the state shown in FIG. 3, in the second-type audio mode information determined by the mobile terminal, specifically, the first speaker 211 may be in the left-channel play mode, and the third speaker 213 may be in the right-channel play mode. In this way, when the mobile terminal controls the first speaker 211 to work in the left-channel play mode and controls the third speaker 213 to work in the right-channel play mode, the first speaker 211, the second speaker 212, and the third speaker 213 can cooperate with each other without mutual interference, and the user can hear the stereo sound emitted by the mobile terminal based on the first speaker 211 and the third speaker 213.

When the mobile terminal is in the state shown in FIG. 5, in the third-type audio mode information determined by the mobile terminal, the third speaker 213 is in an off mode. In this way, based on the third-type audio mode information, the mobile terminal controls the third speaker 213 to work in the off mode, thereby preventing the third speaker 213 from causing interference to the sound emitted by the first speaker 211.

It can be learned that through configuration of the third speaker 213, in the use state corresponding to the second-type audio mode information, the mobile terminal can emit the stereo sound, and in various use states, the speakers do not interfere with each other. This can better guarantee the sound effect of the mobile terminal. In addition, it should be noted that in this embodiment, only three speakers are required to ensure that the mobile terminal provides a good sound effect in most use states, which helps reduce production costs of the mobile terminal.

Optionally, one of the first sub-screen and the second sub-screen is provided with an infrared sensor.

Obtaining a screen use state of the mobile terminal includes: controlling the infrared sensor to emit infrared light, and controlling the infrared sensor to receive reflected light resulting from reflection of the infrared light; when a luminous flux of the reflected light is greater than a preset luminous flux, determining that the screen folding state is the folded state; and when the luminous flux of the reflected light is less than or equal to the preset luminous flux, determining that the screen folding state is the unfolded state.

A specific value of the preset luminous flux can be determined according to an actual situation. This is not limited in this embodiment.

Figure 6:
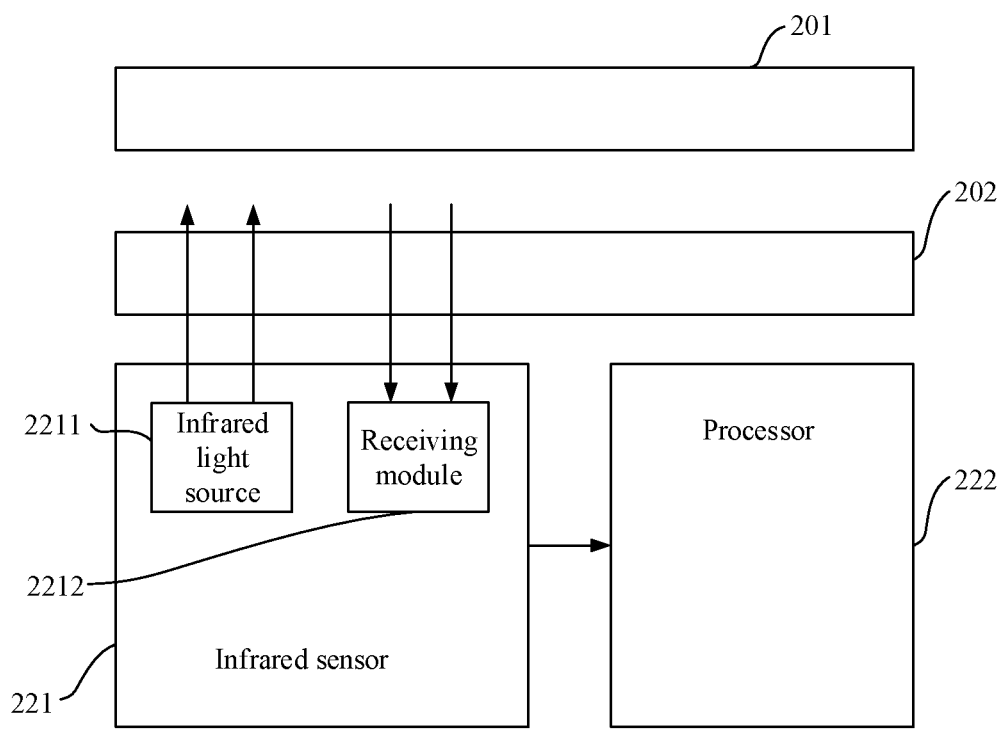
FIG. 6 is a principle diagram of obtaining a screen folding state of a mobile terminal.

In this embodiment, as shown in FIG. 2, FIG. 3, and FIG. 6, the second sub-screen 202 may be provided with an infrared sensor 221 (specifically, it may be disposed under a surface of the second sub-screen 202), and the infrared sensor 221 may include an infrared light source 2211, a receiving module 2212, a register, and a power supply. The infrared light source 2211 is configured to emit infrared light, and the receiving module 2212 is configured to receive reflected light resulting from reflection of the infrared light. It can be understood that when there is an obstacle in front of the infrared light source 2211, the receiving module 2212 can receive the reflected light, and when the obstacle is closer to the infrared light source 2211, the receiving module 2212 receives more reflected light, and otherwise receives less infrared light.

In view of this, in this embodiment, a control pin and an output pin of the infrared sensor 221 are connected to General Purpose Input/Output Port (GPIO) of a processor 222 of the mobile terminal, and the processor 222 may read data from and write data to the register of the infrared sensor 221 through the control pin, to control the infrared sensor 221. In a specific implementation, the processor 222 may output a control instruction from the GPIO, to control light intensity of the infrared light emitted by the infrared light source 2211 and notify the infrared sensor 221 of the preset luminous flux; and the processor 222 may further determine the screen folding state of the mobile terminal based on an amplitude of a level signal from the GPIO.

After receiving the control instruction from the processor 222, the infrared light source 2211 emits the infrared light with the corresponding light intensity according to the control instruction.

If the mobile terminal is in the state shown in FIG. 5, because the infrared sensor 221 is obscured by the first sub-screen 201, the receiving module 2212 can receive a large amount of reflected light, and the luminous flux of the reflected light received by the receiving module 2212 is greater than the preset luminous flux. In this case, the output pin of the infrared sensor 221 outputs a low-level signal. Because the GPIO of the processor 222 is connected to the output pin of the infrared sensor 221, a pin level of the GPIO of the processor 222 is pulled down. In this way, the processor 222 can determine that the screen folding state of the mobile terminal is the folded state. In this case, the mobile terminal can immediately control each speaker to work in a corresponding audio mode in the third-type audio mode information.

Figure 4:
FIG. 4 is a schematic diagram of yet another use state of a mobile terminal.

If the mobile terminal is in the states shown in FIG. 2 to FIG. 4, because the infrared sensor 221 is not obscured by the first sub-screen 201, the receiving module 2212 hardly receives the reflected light, and the luminous flux of the reflected light received by the receiving module 2212 is less than the preset luminous flux. In this case, the output pin of the infrared sensor 221 outputs a high-level signal. In this case, a pin level of the GPIO of the processor 222 is not pulled down, and the processor 222 can determine that the screen folding state of the mobile terminal is the unfolded state.

It can be learned that in this embodiment, the mobile terminal can easily determine the screen folding state.

Figure 7:
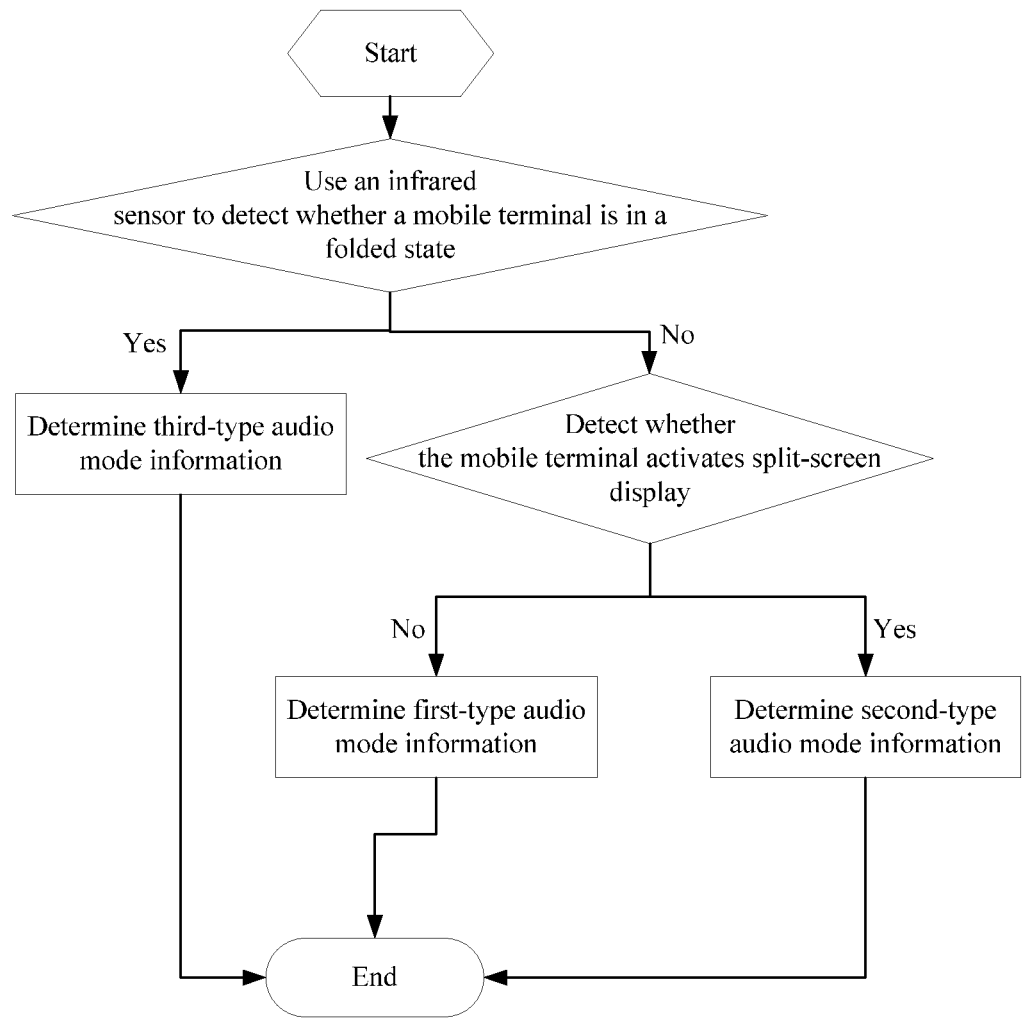
FIG. 7 is a flowchart of another speaker control method according to an embodiment of this disclosure.

In this embodiment, as shown in FIG. 7, the mobile terminal may use an infrared sensor to detect whether the mobile terminal is in the folded state, for example, periodically detect whether the mobile terminal is in the folded state.

If the mobile terminal is in the folded state, the mobile terminal can directly determine the third-type audio mode information, and control each speaker to work in the corresponding audio mode in the third-type audio mode information.

If the mobile terminal is not in the folded state, the mobile terminal can periodically detect whether the mobile terminal activates split-screen display. If the split-screen display is activated, the mobile terminal can determine the second-type audio mode information, and control each speaker to work in the corresponding audio mode in the second-type audio mode information; or if the split-screen display is deactivated, the mobile terminal can determine the first-type audio mode information, and control each speaker to work in the corresponding audio mode in the first-type audio mode information.

It can be learned that in this embodiment, by using the infrared sensor to determine the screen folding state of the mobile terminal and determining whether the mobile terminal has activated the split-screen display, the mobile terminal can easily determine the use state of the mobile terminal and determine the corresponding audio mode information based on the use state.

In conclusion, compared with the related art, this embodiment can effectively ensure the sound effect of the mobile terminal.

The following describes the mobile terminal provided in the embodiments of this disclosure.

Figure 8:
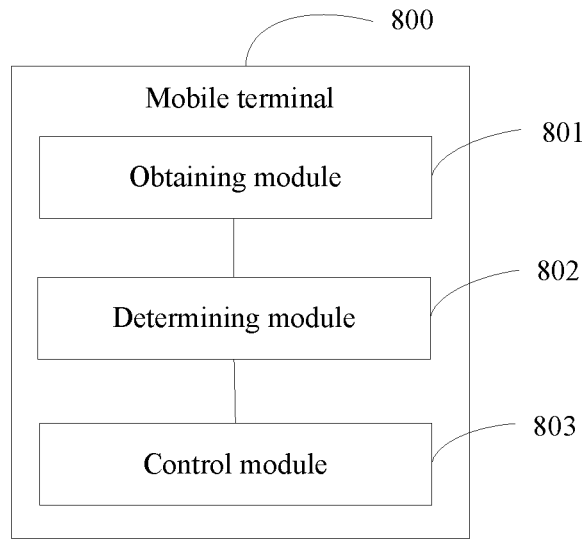
FIG. 8 is a schematic structural diagram of a mobile terminal according to an embodiment of this disclosure.

FIG. 8 is a schematic structural diagram of a mobile terminal 800 according to an embodiment of this disclosure. As shown in FIG. 8, the mobile terminal 800 includes at least two speakers, and the mobile terminal 800 includes: an obtaining module 801, configured to obtain a use state of the mobile terminal; a determining module 802, configured to determine corresponding audio mode information based on the use state of the mobile terminal, where the audio mode information includes a corresponding audio mode of each speaker; and a control module 803, configured to control each speaker to work in the corresponding audio mode in the audio mode information.

Optionally, the mobile terminal 800 includes a foldable screen.

The obtaining module 801 is specifically configured to: obtain a screen use state of the mobile terminal, where the screen use state includes at least one of a screen folding state or a screen display state.

Optionally, the determining module 802 is specifically configured to: determine first-type audio mode information when the screen folding state is an unfolded state and the screen display state is a full-screen display state; determine second-type audio mode information when the screen folding state is an unfolded state and the screen display state is a split-screen display state; and determine third-type audio mode information when the screen folding state is a folded state.

Optionally, the foldable screen includes a first sub-screen and a second sub-screen. The mobile terminal is provided with a first speaker corresponding to the first sub-screen, and the mobile terminal is provided with a second speaker corresponding to the second sub-screen.

In the first-type audio mode information, audio modes of the first speaker and the second speaker form a stereo play mode.

In the second-type audio mode information, the first speaker is in a mono-channel play mode or a mixed-channel play mode, and the second speaker is in a mono-channel play mode or a mixed-channel play mode.

In the third-type audio mode information, one of the first speaker and the second speaker is in a mono-channel play mode or a mixed-channel play mode, and the other of the first speaker and the second speaker is in an off mode.

Optionally, the mobile terminal is further provided with a third speaker corresponding to the first sub-screen.

In the first-type audio mode information, the third speaker is in an off mode.

In the second-type audio mode information, audio modes of the third speaker and the first speaker form a stereo play mode.

In the third-type audio mode information, the third speaker is in an off mode.

Optionally, one of the first sub-screen and the second sub-screen is provided with an infrared sensor.

Figure 9:
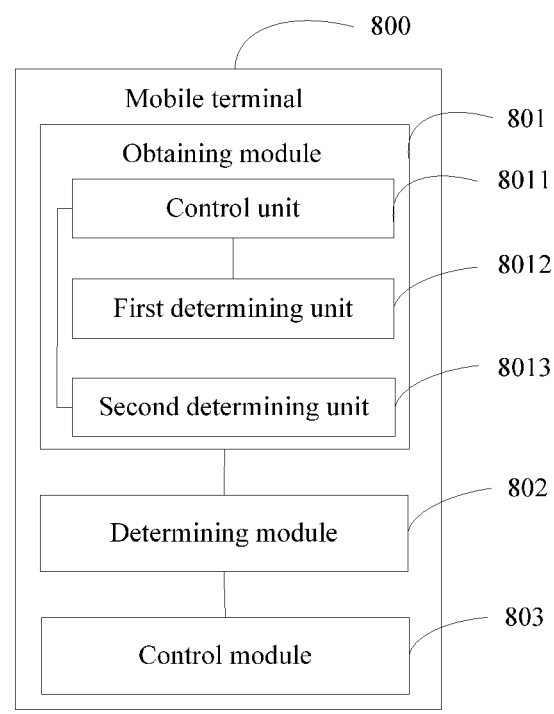
FIG. 9 is a schematic structural diagram of another mobile terminal according to an embodiment of this disclosure.

As shown in FIG. 9, the obtaining module 801 includes: a control unit 8011, configured to: control the infrared sensor to emit infrared light, and control the infrared sensor to receive reflected light resulting from reflection of the infrared light; a first determining unit 8012, configured to: when luminous flux of the reflected light is greater than a preset luminous flux, determine that the screen folding state is the folded state; and a second determining unit 8013, configured to: when the luminous flux of the reflected light is less than or equal to the preset luminous flux, determine that the screen folding state is the unfolded state.

It should be noted that the terminal device 800 provided in this embodiment of this disclosure can implement the processes implemented by the mobile terminal in the foregoing method embodiment. To avoid repetition, details are not described herein again. In this embodiment of this disclosure, audio modes of the speakers in the mobile terminal 800 are not fixed, and the mobile terminal 800 can control each speaker to work in the corresponding audio mode based on the use state of the mobile terminal. To be specific, the mobile terminal 800 can flexibly adjust the audio modes of the speakers based on the use state of the mobile terminal 800. In this way, the speakers can always cooperate with each other without mutual interference. Therefore, compared with the related art, this embodiment of this disclosure can effectively ensure a sound effect of the mobile terminal 800.

Figure 10:
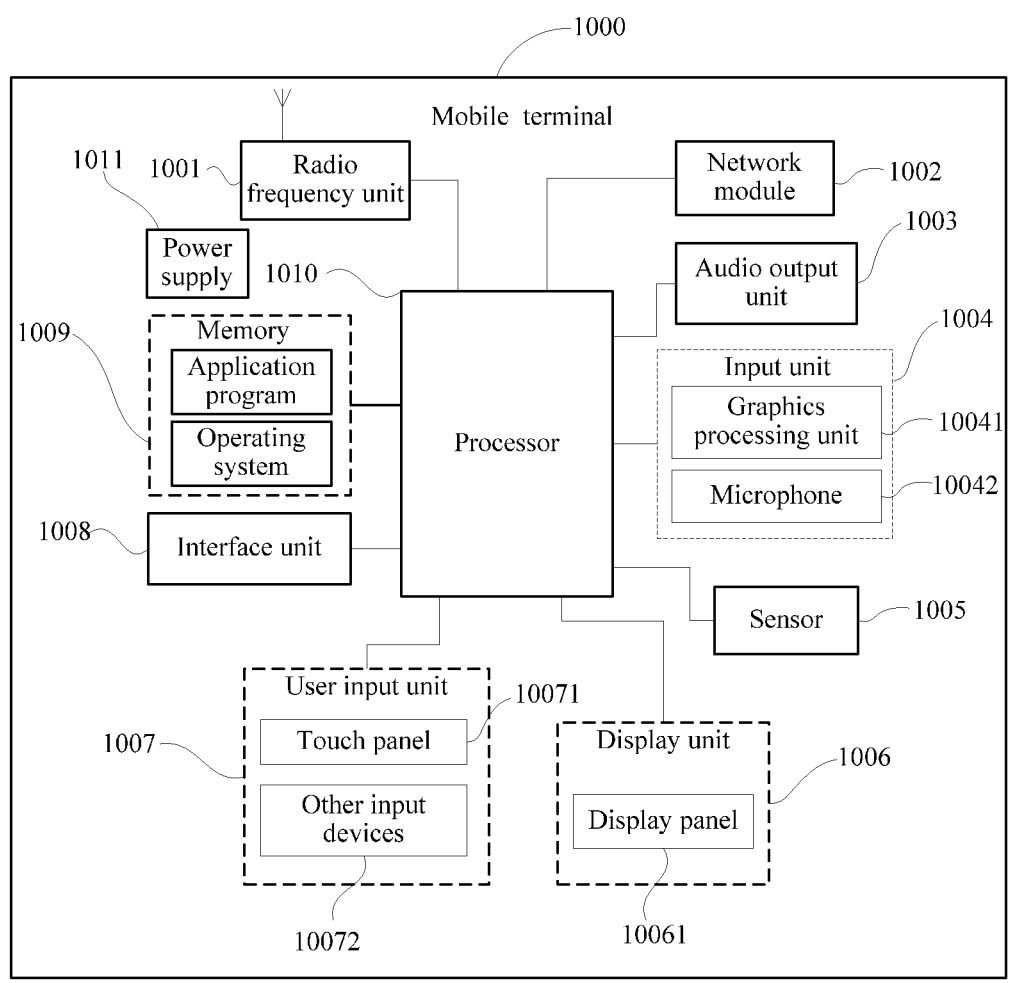
FIG. 10 is a schematic structural diagram of hardware of another mobile terminal according to an embodiment of this disclosure.

FIG. 10 is a schematic structural diagram of hardware of a mobile terminal 1000 implementing the embodiments of this disclosure. As shown in FIG. 10, the mobile terminal 1000 includes but is not limited to a radio frequency unit 1001, a network module 1002, an audio output unit 1003, an input unit 1004, a sensor 1005, a display unit 1006, a user input unit 1007, an interface unit 1008, a memory 1009, a processor 1010, and a power supply 1011. A persons skilled in the art can understand that FIG. 10 does not limit the mobile terminal 1000 to the specific structure shown in the figure, and the mobile terminal 1000 may include components more or fewer than those shown in the figure, some components may be combined, or the components may be configured differently. In this embodiment of this disclosure, the mobile terminal 1000 includes but is not limited to a mobile phone, a tablet computer, a palmtop computer, a vehicle-mounted terminal, a wearable device, a pedometer, and the like. It should be noted that the mobile terminal 1000 includes at least two speakers.

The processor 1010 is configured to: obtain a use state of the mobile terminal; determine corresponding audio mode information based on the use state of the mobile terminal, where the audio mode information includes audio modes of the at least two speakers; and control each speaker to work in a corresponding audio mode in the audio mode information.

In this embodiment of this disclosure, audio modes of the speakers in the mobile terminal 1000 are not fixed, and the mobile terminal 1000 can control each speaker to work in the corresponding audio mode based on the use state of the mobile terminal. To be specific, the mobile terminal 1000 can flexibly adjust the audio modes of the speakers based on the use state of the mobile terminal 1000. In this way, the speakers can always cooperate with each other without mutual interference. Therefore, compared with the related art, this embodiment of this disclosure can effectively ensure a sound effect of the mobile terminal 1000.

Optionally, the mobile terminal includes a foldable screen. The processor 1010 is specifically configured to: obtain a screen use state of the mobile terminal, where the screen use state includes at least one of a screen folding state or a screen display state.

Optionally, the processor 1010 is specifically configured to: determine first-type audio mode information when the screen folding state is an unfolded state and the screen display state is a full-screen display state; determine second-type audio mode information when the screen folding state is an unfolded state and the screen display state is a split-screen display state; and determine third-type audio mode information when the screen folding state is a folded state.

Optionally, the foldable screen includes a first sub-screen and a second sub-screen. The mobile terminal is provided with a first speaker corresponding to the first sub-screen, and the mobile terminal is provided with a second speaker corresponding to the second sub-screen.

In the first-type audio mode information, audio modes of the first speaker and the second speaker form a stereo play mode.

In the second-type audio mode information, the first speaker is in a mono-channel play mode or a mixed-channel play mode, and the second speaker is in a mono-channel play mode or a mixed-channel play mode.

In the third-type audio mode information, one of the first speaker and the second speaker is in a mono-channel play mode or a mixed-channel play mode, and the other of the first speaker and the second speaker is in an off mode.

Optionally, the mobile terminal is further provided with a third speaker corresponding to the first sub-screen.

In the first-type audio mode information, the third speaker is in an off mode.

In the second-type audio mode information, audio modes of the third speaker and the first speaker form a stereo play mode.

In the third-type audio mode information, the third speaker is in an off mode.

Optionally, one of the first sub-screen and the second sub-screen is provided with an infrared sensor.

The processor 1010 is specifically configured to: control the infrared sensor to emit infrared light, and control the infrared sensor to receive reflected light resulting from reflection of the infrared light; when a luminous flux of the reflected light is greater than a preset luminous flux, determine that the screen folding state is the folded state; and when the luminous flux of the reflected light is less than or equal to the preset luminous flux, determine that the screen folding state is the unfolded state.

It should be understood that in this embodiment of this disclosure, the radio frequency unit 1001 may be configured to: receive and send signals in an information receiving/sending process or a call process; and specifically, after receiving downlink data from a base station, send the downlink information to the processor 1010 for processing, and in addition, send uplink data to the base station. Generally, the radio frequency unit 1001 includes but is not limited to an antenna, at least one amplifier, a transceiver, a coupler, a low noise amplifier, a duplexer, and the like. In addition, the radio frequency unit 1001 may further communicate with a network and another device through a wireless communications system.

The mobile terminal provides a user with wireless broadband internet access through the network module 1002, for example, helping the user to send or receive an e-mail, to browse a web page, or to access streaming media.

The audio output unit 1003 may convert audio data received by the radio frequency unit 1001 or the network module 1002 or stored in the memory 1009 into an audio signal and output the audio signal as a sound. Furthermore, the audio output unit 1003 may also provide audio output (for example, a call signal received sound ora message received sound) related to a specific function performed by the mobile terminal 1000. The audio output unit 1003 includes a speaker, a buzzer, a telephone receiver, and the like.

The input unit 1004 is configured to receive an audio or video signal. The input unit 1004 may include a graphics processing unit (Graphics Processing Unit, GPU) 10041 and a microphone 10042. The graphics processing unit 10041 processes image data of a still picture or a video obtained by an image capture apparatus (for example, a camera) in an image capture mode or a video capture mode. A processed image frame may be displayed on the display unit 1006. An image frame processed by the graphics processing unit 10041 may be stored in the memory 1009 (or another storage medium) or sent by the radio frequency unit 1001 or the network module 1002. The microphone 10042 can receive a sound and process the sound into audio data. The processed audio data can be converted into a format that can be sent to a mobile communication base station through the radio frequency unit 1001 in a telephone call mode, for outputting.

The mobile terminal 1000 further includes at least one sensor 1005, such as a light sensor, a motion sensor, and other sensors. Specifically, the light sensor includes an ambient light sensor and a proximity sensor, where the ambient light sensor can adjust luminance of a display panel 10061 based on brightness of ambient light, and the proximity sensor can turn off the display panel 10061 and/or backlight when the mobile terminal 1000 is moved to an ear. As a type of motion sensor, an accelerometer sensor can detect magnitudes of accelerations in all directions (usually three axes), can detect a magnitude and a direction of gravity when the mobile phone is in a static state, and can be applied to mobile phone posture recognition (such as screen switching between portrait and landscape modes, related games, and magnetometer posture calibration), functions related to vibration recognition (such as pedometer and tapping), and the like. The sensor 1005 may also include a fingerprint sensor, a pressure sensor, an iris sensor, a molecular sensor, a gyroscope, a barometer, a hygrometer, a thermometer, an infrared sensor, and the like. Details are not described herein.

The display unit 1006 is configured to display information input by the user or information provided for the user. The display unit 1006 may include the display panel 10061, and the display panel 10061 may be configured in the form of a Liquid Crystal Display (LCD), an Organic Light-Emitting Diode (OLED), or the like.

The user input unit 1007 may be configured to receive input digit or character information and generate key signal input related to user setting and function control of the mobile terminal. Specifically, the user input unit 1007 includes a touch panel 10071 and other input devices 10072. The touch panel 10071, also referred to as a touchscreen, may capture a touch operation performed by a user on or near the touch panel (for example, an operation performed by the user on the touch panel 10071 or near the touch panel 10071 by using any appropriate object or accessory such as a finger or a stylus). The touch panel 10071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, sends the point coordinates to the processor 1010, and receives and executes a command sent by the processor 1010. In addition, the touch panel 10071 may be implemented in a plurality of forms, for example, as a resistive, capacitive, infrared, or surface acoustic wave touch panel. The user input unit 1007 may further include the other input devices 10072 in addition to the touch panel 10071. Specifically, the other input devices 10072 may include but are not limited to a physical keyboard, a function key (such as a volume control key or a power on/off key), a trackball, a mouse, a joystick, and the like. Details are not described herein.

Further, the touch panel 10071 may cover the display panel 10061. After detecting a touch operation on or near the touch panel 10071, the touch panel 10071 transmits information about the touch operation to the processor 1010 for the processor 1010 to determine a touch event type, and then the processor 1010 provides a corresponding visual output on the display panel 10061 based on the touch event type. Although in FIG. 10, the touch panel 10071 and the display panel 10061 act as two independent parts to implement input and output functions of the mobile terminal, in some embodiments, the touch panel 10071 and the display panel 10061 may be integrated to implement the input and output functions of the mobile terminal. This is not specifically limited herein.

The interface unit 1008 is an interface connecting an external apparatus to the mobile terminal 1000. For example, the external apparatus may include a wired or wireless headphone port, an external power (or battery charger) port, a wired or wireless data port, a memory card port, a port for connecting an apparatus having a recognition module, an audio input/output (I/O) port, a video I/O port, an earphone port, and the like. The interface unit 1008 may be configured to: receive input (for example, data information and power) from the external apparatus, and transmit the received input to one or more elements in the mobile terminal 1000, or may be configured to transmit data between the mobile terminal 1000 and the external apparatus.

The memory 1009 may be configured to store a software program and various data. The memory 1009 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 1009 may include a high-speed random access memory, or may include a non-volatile memory, for example, at least one magnetic disk storage device, a flash memory device, or other volatile solid-state storage devices.

The processor 1010 is a control center of the mobile terminal, and is connected to all components of the mobile terminal by using various interfaces and lines. By running or executing a software program and/or module that is stored in the memory 1009 and calling data stored in the memory 1009, the processor 1010 executes various functions of the mobile terminal and processes data, so as to perform overall monitoring on the mobile terminal. The processor 1010 may include one or more processing units. Optionally, an application processor and a modem processor may be integrated into the processor 1010. The application processor mainly processes an operating system, a user interface, an application program, and the like. The modem processor mainly processes wireless communication. It may be understood that the modem processor may alternatively not be integrated into the processor 1010.

The mobile terminal 1000 may further include the power supply 1011 (for example, a battery) supplying power to all components. Optionally, the power supply 1011 may be logically connected to the processor 1010 through a power management system. In this way, functions such as charge management, discharge management, and power consumption management are implemented by using the power management system.

In addition, the mobile terminal 1000 includes some functional modules that are not shown, details of which are not described herein.

Optionally, an embodiment of this disclosure further provides a mobile terminal, including a processor 1010, a memory 1009, and a computer program that is stored in the memory 1009 and capable of running on the processor 1010, where when the computer program is executed by the processor 1010, the procedures of the foregoing speaker control method embodiments are implemented, with the same technical effects. To avoid repetition, details are not described herein again.

An embodiment of this disclosure further provides a computer-readable storage medium, where the computer-readable storage medium stores a computer program, and when the computer program is executed by a processor, the procedures of the foregoing speaker control method embodiments are implemented, with the same technical effects. To avoid repetition, details are not described herein again. The computer-readable storage medium is, for example, a Read-Only Memory (ROM), a Random Access Memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In many cases, the former is a more frequent implementation. Based on such an understanding, the technical solutions of this disclosure essentially, or the part contributing to the related art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A speaker control method, performed by a mobile terminal, wherein the mobile terminal comprises at least two speakers and a foldable screen, and the method comprises:
   obtaining a screen use state of the mobile terminal, wherein the screen use state comprises at least one of a screen folding state or a screen display state, the screen display state including a full-screen display state or a split-screen display state;
   determining corresponding audio mode information based on the screen use state of the mobile terminal, wherein the audio mode information comprises audio modes of the at least two speakers, and determining corresponding audio mode information based on the screen use state of the mobile terminal comprises:
      determining first-type audio mode information when the screen folding state is an unfolded state and the screen display state is a full-screen display state;
      determining second-type audio mode information when the screen folding state is an unfolded state and the screen display state is a split-screen display state; and
      determining third-type audio mode information when the screen folding state is a folded state; and
   controlling each speaker to work in a corresponding audio mode in the audio mode information.

2. The speaker control method according to claim 1, wherein the foldable screen comprises a first sub-screen and a second sub-screen, the mobile terminal is provided with a first speaker corresponding to the first sub-screen, and the mobile terminal is provided with a second speaker corresponding to the second sub-screen;
   in the first-type audio mode information, audio modes of the first speaker and the second speaker form a stereo play mode;
   in the second-type audio mode information, the first speaker is in a mono-channel play mode or a mixed-channel play mode, and the second speaker is in a mono-channel play mode or a mixed-channel play mode; and
   in the third-type audio mode information, one of the first speaker and the second speaker is in a mono-channel play mode or a mixed-channel play mode, and the other of the first speaker and the second speaker is in an off mode.

3. The speaker control method according to claim 2, wherein the mobile terminal is provided with a third speaker corresponding to the first sub-screen;
   in the first-type audio mode information, the third speaker is in an off mode;
   in the second-type audio mode information, audio modes of the third speaker and the first speaker form a stereo play mode; and
   in the third-type audio mode information, the third speaker is in an off mode.

4. The speaker control method according to claim 2, wherein one of the first sub-screen and the second sub-screen is provided with an infrared sensor; and
   obtaining a screen use state of the mobile terminal comprises:
   controlling the infrared sensor to emit infrared light, and controlling the infrared sensor to receive reflected light resulting from reflection of the infrared light;
   when a luminous flux of the reflected light is greater than a preset luminous flux, determining that the screen folding state is the folded state; and
   when the luminous flux of the reflected light is less than or equal to the preset luminous flux, determining that the screen folding state is the unfolded state.

5. A mobile terminal, comprising:
   at least two speakers and a foldable screen;
   a processor; and
   a memory communicatively coupled to the processor, the memory storing computer programs that, when executed by the processor, cause the processor to:
      obtain a screen use state of the mobile terminal, wherein the screen use state comprises at least one of a screen folding state or a screen display state, the screen display state including a full-screen display state or a split-screen display state;
      determine corresponding audio mode information based on the screen use state of the mobile terminal, wherein the audio mode information comprises a corresponding audio mode of each speaker, and to determine corresponding audio mode information based on the screen use state of the mobile terminal, the processor is further caused to:
         determine first-type audio mode information when the screen folding state is an unfolded state and the screen display state is a full-screen display state;
         determine second-type audio mode information when the screen folding state is an unfolded state and the screen display state is a split-screen display state; and
         determine third-type audio mode information when the screen folding state is a folded state; and
      control each speaker to work in the corresponding audio mode in the audio mode information.

6. The mobile terminal according to claim 5, wherein the foldable screen comprises a first sub-screen and a second sub-screen, the mobile terminal is provided with a first speaker corresponding to the first sub-screen, and the mobile terminal is provided with a second speaker corresponding to the second sub-screen;
   in the first-type audio mode information, audio modes of the first speaker and the second speaker form a stereo play mode;
   in the second-type audio mode information, the first speaker is in a mono-channel play mode or a mixed-channel play mode, and the second speaker is in a mono-channel play mode or a mixed-channel play mode; and in the third-type audio mode information, one of the first speaker and the second speaker is in a mono-channel play mode or a mixed-channel play mode, and the other of the first speaker and the second speaker is in an off mode.

7. The mobile terminal according to claim 6, further comprising a third speaker corresponding to the first sub-screen;

in the first-type audio mode information, the third speaker is in an off mode;

in the second-type audio mode information, audio modes of the third speaker and the first speaker form a stereo play mode; and in the third-type audio mode information, the third speaker is in an off mode.

8. The mobile terminal according to claim 6, wherein one of the first sub-screen and the second sub-screen is provided with an infrared sensor; and the computer programs, when executed by the processor, further cause the processor to:

control the infrared sensor to emit infrared light, and control the infrared sensor to receive reflected light resulting from reflection of the infrared light;

when a luminous flux of the reflected light is greater than a preset luminous flux, determine that the screen folding state is the folded state; and when the luminous flux of the reflected light is less than or equal to the preset luminous flux, determine that the screen folding state is the unfolded state.

9. A non-transitory computer-readable storage medium, storing computer programs that, when executed by a processor of a mobile terminal, cause the processor to implement operations comprising:

obtaining a screen use state of the mobile terminal, wherein the screen use state comprises at least one of a screen folding state or a screen display state, the screen display state including a full-screen display state or a split-screen display state;

determining corresponding audio mode information based on the screen use state of the mobile terminal, wherein the audio mode information comprises audio modes of the at least two speakers, and determining corresponding audio mode information based on the screen use state of the mobile terminal comprises:

determining first-type audio mode information when the screen folding state is an unfolded state and the screen display state is a full-screen display state;

determining second-type audio mode information when the screen folding state is an unfolded state and the screen display state is a split-screen display state; and determining third-type audio mode information when the screen folding state is a folded state; and controlling each speaker to work in the corresponding audio mode in the audio mode information.

10. The non-transitory computer-readable storage medium according to claim 9, wherein the foldable screen comprises a first sub-screen and a second sub-screen, the mobile terminal is provided with a first speaker corresponding to the first sub-screen, and the mobile terminal is provided with a second speaker corresponding to the second sub-screen;

in the first-type audio mode information, audio modes of the first speaker and the second speaker form a stereo play mode;

in the second-type audio mode information, the first speaker is in a mono-channel play mode or a mixed-channel play mode, and the second speaker is in a mono-channel play mode or a mixed-channel play mode; and in the third-type audio mode information, one of the first speaker and the second speaker is in a mono-channel play mode or a mixed-channel play mode, and the other of the first speaker and the second speaker is in an off mode.

11. The non-transitory computer-readable storage medium according to claim 10, wherein the mobile terminal is provided with a third speaker corresponding to the first sub-screen;

in the first-type audio mode information, the third speaker is in an off mode;

in the second-type audio mode information, audio modes of the third speaker and the first speaker form a stereo play mode; and in the third-type audio mode information, the third speaker is in an off mode.

12. The non-transitory computer-readable storage medium according to claim 10, wherein one of the first sub-screen and the second sub-screen is provided with an infrared sensor; and obtaining a screen use state of the mobile terminal comprises:

controlling the infrared sensor to emit infrared light, and controlling the infrared sensor to receive reflected light resulting from reflection of the infrared light;

when a luminous flux of the reflected light is greater than a preset luminous flux, determining that the screen folding state is the folded state; and when the luminous flux of the reflected light is less than or equal to the preset luminous flux, determining that the screen folding state is the unfolded state.

* * * * *